(No Model.)
H. C. GALLUP.
TRICYCLE.
No. 264,073. Patented Sept. 12, 1882.
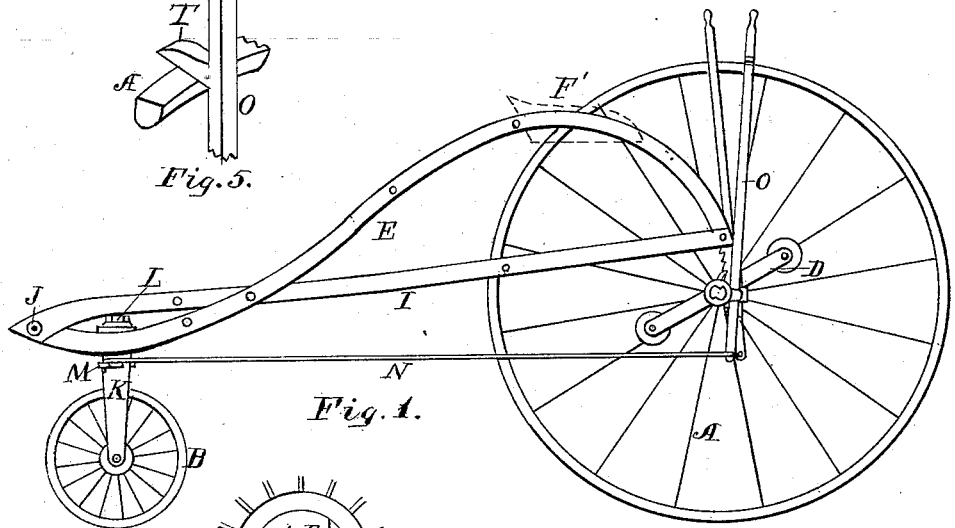
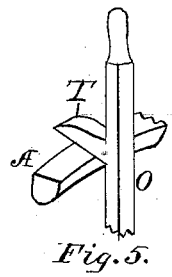
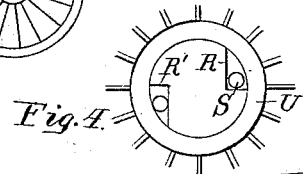
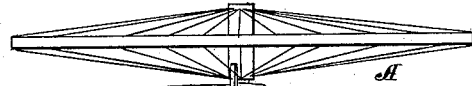
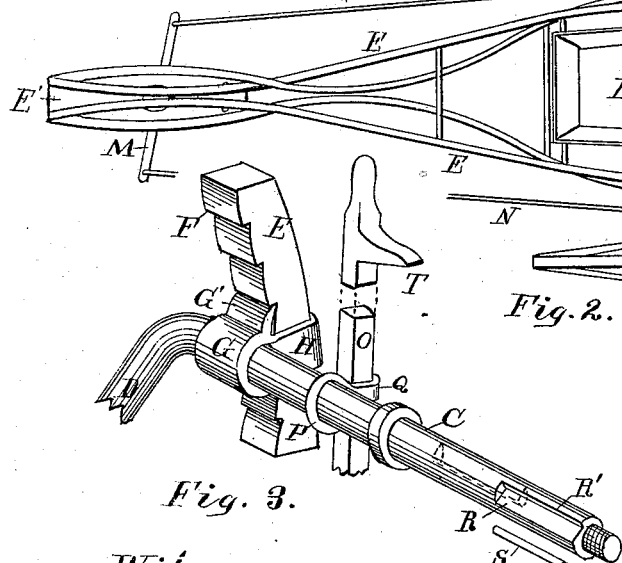
Witnesses:
O. J. Bailey
C. H. Jones
Inventor:
H. C. Gallup
by L. S. Serb
Atty.

UNITED STATES PATENT OFFICE.

HENRY C. GALLUP, OF WILMINGTON, OHIO.

TRICYCLE.

SPECIFICATION forming part of Letters Patent No. 264,073, dated September 12, 1882.

Application filed April 28, 1882. (No model.)

*To all whom it may concern:*

Be it known that I, HENRY C. GALLUP, of Wilmington, in the county of Clinton and State of Ohio, have invented a new and useful Improvement in Tricycles, which improvement is fully set forth in the following specification and accompanying drawings, in which—

Figure 1 is a side elevation of the improved tricycle. Fig. 2 is a top view. Fig. 3 is an enlarged perspective elevation of portion of the shaft, showing connection of the same with the frame, guide-lever attachment, and clutch for the hub in detail. Fig. 4 is an enlarged perspective view of end of shaft and hub, and Fig. 5 is a perspective view of portion of wheel and the braking-lever.

The object of the present invention is to provide a tricycle adapted to be operated by both sexes; and it consists, first, in an improved form of constructing the frame; second, its attachment to the cross-shaft containing the cranks for operating the tricycle, whereby it may be vertically adjusted to suit the operator; third, the braking mechanism controlled by the same lever that guides the vehicle; and, fourth, the clutching device in the hub of the forward or drive wheels, all of which will now be described in detail.

In the accompanying drawings, A A represent the forward drive-wheels, and B the rear or trailing wheel. The forward drive-wheels are made of any suitable size, preferably much larger than the rear trailing-wheel.

C is the cross-shaft or axle for the drive-wheels A. Centrally the shaft C is provided with two oppositely-disposed cranks, D, by means of which the operator propels the vehicle with the feet.

The frame of the device is composed of two peculiarly-bent main pieces, E, united at their rear ends to a block, E', by the bolt J. The forward ends diverge from each other and are bent upwardly to a point corresponding with the rear side of the wheels A, from which point they gradually curve downward and extend over and down past the forward side of the axle or shaft C. The ends of the frame-pieces E pass through a stirrup, H, which stirrup is attached to or cast with a band, thimble, or boxing, G, through which the shaft C passes. The inner edges of the curved frame-pieces E are provided with suitable notches, F, and the stirrup H has on the upper side a tooth, G, which is adapted to enter the notches F, so that when the frame E is raised or lowered to adjust the seat F' from the shaft C the teeth G' will hold the frame in the desired position. Two horizontally-disposed pieces, I, attached at the forward downturned ends of the main pieces E, have their rear ends also united together to the block E' by means of the bolt J. The frame thus constructed is firm, and at the same time light, and may be constructed either of bent wood or of tubes, as desired.

The rear wheel, B, is held in position by means of the vertical spindle K, which is journaled in the frame-block E' and held to the block by the nut L, or other suitable device. A cross-arm, M, projecting out a suitable distance on each side, is designed to afford a means for attaching the guide-rods N, which extend forward on each side to the vertical levers O, to the lower ends of which they are hinged. The vertical rods O are pivoted to the shaft C, next to the legs of the frame E, by means of stirrup Q. The stirrups Q are preferably cast with a ring, P, to fit over the shaft C, so that while the levers O are capable of having their ends move backward and forward to turn the rear wheel, B, the upper end is also permitted to move sidewise, or to and from the wheels A. The object of this will be explained. At the upper ends of the levers O, and projecting out at points corresponding to the top of the wheels, are arms T, which strike the tire of the wheel when the levers O are moved outwardly. Thus the arms T act as brake-blocks for checking the speed of the vehicle.

It is obvious that if both the forward wheels A were secured permanently with the shaft C it would be difficult to turn the tricycle, and to provide for this each wheel is loosely journaled on the shaft and suitable friction-clutches arranged between the shaft and hub, so that when a forward motion is imparted to the shaft C the clutch will drive the wheels, but when the motion of the shaft is reversed it will have no effect on the wheels. To accomplish this in a simple manner, I provide the axle with one or more tangential faces, R, which abruptly terminate in a radiating face, R'. A round bar, S, rests in the cavity thus formed. In operation the axle, when turned in one direction, will cause the round bar S to roll out on the tangential face R and bind against the hub U, which is placed on the axle over these cavities. I prefer to have two or more of these cavities for each hub formed in opposite sides of the axle.

The operation is as follows: The forward end of the frame is first adjusted by raising or lowering the legs E in the stirrups H to suit the operator or rider. The feet are then placed on the opposite cranks and propelled forward in the usual manner. The hands grasp the levers O, guiding the vehicle by moving them either backward or forward. Should the rider desire to check the speed of the vehicle, the levers are moved toward the wheels A and the brake-blocks T brought in contact with the wheels A.

Having described my invention, what I claim is—

1. In tricycles, the frame composed of the bent pieces E I, united at their ends to the block E', and having notches or teeth F on the forward ends, in combination with the revolving shaft or axle C, having the boxing G, provided with the stirrups H and tooth G', substantially as and for the purpose herein shown.

2. In tricycles, the shaft C and drive-wheels A, in combination with laterally-movable levers O, hinged to the shaft C, having thereon the projecting arms or brake-blocks T, substantially as herein shown.

3. In tricycles, the shaft C, having the laterally-vibrating braking-levers O, in combination with the spindle K, carrying the trailing-wheel B, cross-arm M, and the connecting-rod N, substantially as herein shown.

In testimony that I claim the foregoing I have hereunto set my hand this 24th day of April, 1882, in the presence of witnesses.

HENRY C. GALLUP.

Witnesses:
MELVILLE HAYES,
FRANCIS MARTIN.